(12) United States Patent
Sun et al.

(10) Patent No.: US 9,115,814 B2
(45) Date of Patent: Aug. 25, 2015

(54) VALVE TRIM APPARATUS HAVING A CAVITY TO RECEIVE CONTAMINATES FROM A SEALING SURFACE

(75) Inventors: Zhimin Sun, Tianjin (CN); Chun Gao, Tianjin (CN); Zhengyu Chen, Tianjin (CN)

(73) Assignee: EMERSON PROCESS MANAGEMENT (TIANJIN) VALVE CO., LTD., Tianjin (CN)

( * ) Notice: Subject to any disclaimer, the term of this patent is extended or adjusted under 35 U.S.C. 154(b) by 0 days.

(21) Appl. No.: 13/700,106

(22) PCT Filed: May 25, 2010

(86) PCT No.: PCT/CN2010/073212
§ 371 (c)(1),
(2), (4) Date: Nov. 26, 2012

(87) PCT Pub. No.: WO2011/147078
PCT Pub. Date: Dec. 1, 2011

(65) Prior Publication Data
US 2013/0068987 A1    Mar. 21, 2013

(51) Int. Cl.
*F16K 1/38*    (2006.01)
*F16K 1/42*    (2006.01)
*F16K 3/24*    (2006.01)
(Continued)

(52) U.S. Cl.
CPC . *F16K 1/42* (2013.01); *F16K 3/246* (2013.01); *F16K 25/04* (2013.01); *F16K 1/385* (2013.01); *F16K 25/00* (2013.01)

(58) Field of Classification Search
CPC ........... F16K 1/42; F16K 25/00; F16K 25/04; F16K 3/246; F16K 1/385
USPC ........ 251/332, 333, 334; 137/516.27, 516.29, 137/902; 239/585.1–585.5
See application file for complete search history.

(56) References Cited

U.S. PATENT DOCUMENTS 1,560,235 A * 11/1925 Hinsch ..................... 123/188.1
6,135,523 A    10/2000 Pratt
(Continued)

FOREIGN PATENT DOCUMENTS

CN    2106272 U    6/1992
CN    1071496 A    4/1993
(Continued)

OTHER PUBLICATIONS

Japanese Office Action issued on Feb. 5, 2014 by the Japanese Patent Office in counterpart Japanese Patent Application No. 2013-511496.
(Continued)

*Primary Examiner* — Marina Tietjen
(74) *Attorney, Agent, or Firm* — Marshall, Gerstein & Borun LLP

(57) ABSTRACT

A valve trim apparatus comprises a valve seat (216) and a closure member (214) to operatively engage the valve seat (216). One of the closure member (214) and the valve seat (216) includes a plurality of annular ribs (222), and at least one of the valve seat (216) and the closure member (214) defines at least one groove (218) to be positioned between at least two of the annular ribs (222) to receive material from a sealing surface (220) between the closure member (214) and the valve seat (216) when the closure member (214) is sealingly engaged with the valve seat (216).

18 Claims, 5 Drawing Sheets

(51) Int. Cl.
  *F16K 25/04* (2006.01)
  *F16K 25/00* (2006.01)

(56) References Cited

U.S. PATENT DOCUMENTS

| | | | |
|---|---|---|---|
| 6,502,770 B2 * | 1/2003 | Dallmeyer et al. | 239/585.1 |
| 6,772,993 B1 * | 8/2004 | Miller et al. | 251/363 |
| 6,805,162 B2 * | 10/2004 | Stratton | 137/625.37 |
| 7,537,194 B2 * | 5/2009 | Nagai | 251/77 |
| 2004/0031527 A1 | 2/2004 | Stratton | |
| 2008/0001110 A1 | 1/2008 | Nagai | |
| 2009/0302136 A1 * | 12/2009 | Song | 239/584 |
| 2009/0314979 A1 * | 12/2009 | McIntire | 251/334 |
| 2011/0095222 A1 * | 4/2011 | Flores et al. | 251/359 |

FOREIGN PATENT DOCUMENTS

| | | | |
|---|---|---|---|
| CN | 1816421 A | | 8/2006 |
| CN | 101097000 | | 1/2008 |
| EP | 0 226 157 A2 | | 6/1987 |
| JP | S52-1136 B | | 1/1977 |
| JP | S63-109077 U | | 7/1988 |
| JP | 11-336905 | | 12/1999 |
| JP | 2007-155102 A | | 6/2007 |
| RU | 2249742 C2 | | 4/2005 |
| WO | WO 2005/000524 | * | 1/2005 |

OTHER PUBLICATIONS

International Preliminary Report on Patentability for Application No. PCT/CN2010/073212, dated Nov. 27, 2012.
International Search Report and Written Opinion for Application No. PCT/CN2010/073212, dated Mar. 10, 2011.
Office Action issued on Feb. 8, 2014 by the State Intellectual Property Office in corresponding Chinese Patent Application No. 201080067978.
Chinese Office Action issued on Sep. 10, 2014 by the Chinese Patent Office in counterpart Chinese Patent Application No. 201080067978, and English translation therefore.
Russian Office Action issued by the Russian Patent Office on May 16, 2014 in corresponding Russian Patent Application No. 2012155148, and partial translation thereof.

* cited by examiner

VALVE TRIM APPARATUS HAVING A CAVITY TO RECEIVE CONTAMINATES FROM A SEALING SURFACE

FIELD OF THE DISCLOSURE

This disclosure relates generally to control valves and, more particularly, to valve trim apparatus having a cavity to receive contaminates deposited on a sealing surface of the valve trim.

BACKGROUND

Fluid valves are often used in process control plants or systems to control the flow of process fluids. In general, fluid valves typically include a valve trim assembly or apparatus that includes a valve plug (e.g., a metal valve plug) and a valve seat (e.g., a metal seat ring) that are disposed in a fluid path to control the flow of fluid through a passageway between an inlet and an outlet. A valve stem or shaft operatively couples the valve plug to an actuator such as, for example, a pneumatic actuator, a manual actuator, etc. The actuator moves the valve plug between an open position at which the valve plug is spaced from the valve seat to allow fluid flow through the passageway and a closed position at which the valve plug sealingly engages the valve seat to prevent fluid flow through the passageway.

In severe service applications such as, for example, in the petrochemical industry, control valves may be subjected to severely erosive fluid conditions that can rapidly wear or reduce the operating life of the valve trim (e.g., a valve seat, a valve plug, etc.). For example, the valve trim may be exposed to flowing process fluids that contain entrained particulate (e.g., ceramic catalyst fines). Valve seats and/or valve plugs made of ceramic materials are often employed in severe service applications to reduce damage and/or wear caused by severely erosive process fluids that may otherwise damage metallic valve seats and/or valve plugs, thereby increasing the operating life of the valve seat and/or valve plug.

Although ceramic valve seats and/or valve plugs are highly resistant to the above-noted erosive or corrosive effects of particulate and the like, contaminates or material such as particulate (e.g., entrained particulate catalyst) and/or or relatively high viscosity fluids may adhere to the sealing or seating surfaces of the valve plug and/or the valve seat as the valve plug sealingly engages the valve seat. Such contaminates or material may prevent the sealing surface of the valve plug from sealingly engaging with the seating surface of the valve seat, thereby causing fluid leakage across the valve seat when the valve is in a closed position.

SUMMARY

In one example, a valve trim apparatus includes a valve seat and a valve plug to operatively engage the valve seat. One of the valve plug or valve seat includes a plurality of annular ribs and at least one of the valve seat or valve plug defines at least one groove to be positioned between at least two of the annular ribs to receive material from a sealing surface of the valve plug or valve seat when the valve plug is sealingly engaged with the valve seat.

In another example, a valve trim apparatus includes a valve seat and a valve closure member. The valve closure member and the valve seat cooperatively engage to define a cavity and move contaminate from a sealing surface of the valve seat or valve closure member to the cavity as the valve closure member moves toward a sealing engagement with the valve seat.

DETAILED DESCRIPTION

In general, the example valve trim apparatus described herein may be used with severely erosive and/or relatively high viscosity process fluids such as, for example, process fluids (e.g., hydrogen fluids) having entrained particulate (e.g., ceramic catalyst) that can cause damage or erosion to conventional valve trim components. The example valve trim apparatus described herein significantly increases the operational life of the valve trim compared to conventional valve trim. More specifically, the example valve trim apparatus moves, wipes or channels particulate entrained in a fluid flow and/or high viscosity fluids away from the sealing surface of the valve trim apparatus to provide a relatively contaminate free (e.g., a smooth or clean) sealing surface to enable the valve trim apparatus to sealingly engage and/or prevent leakage when the valve is in a closed position. Additionally, the example valve trim apparatus described herein provides an effective fluid flow dead-band to help move particulate away from a seating surface of the trim apparatus when the trim apparatus is moving toward the closed position.

One example valve trim apparatus described herein includes a valve plug that is to operatively engage a valve seat. The valve plug cooperatively engages the valve seat to define a cavity and move contaminate from a sealing surface of the valve seat or the valve plug to the cavity as the valve plug moves toward a sealing engagement with the valve seat. One of the valve plug or valve seat includes a plurality of annular protrusions or ribs. At least one of the valve seat or valve plug defines at least one groove to be positioned between at least two of the annular protrusions to receive material or contaminate (e.g., particulate, viscous fluids, etc.) from a sealing surface of the valve plug or valve seat when the valve plug is sealingly engaged with the valve seat.

Additionally, a cage and the valve plug and are configured to provide an effective fluid flow dead-band to protect the sealing surface of the valve trim apparatus from erosion, corrosion and/or damage. In particular, the valve plug cooperatively engages the cage to obstruct the fluid flow and reduce a residual quantity of fluid and/or particulate flowing across the sealing surface of the trim apparatus as the valve plug moves toward the valve seat and before the valve plug is sealingly engaged with the valve seat.

Figure 1:
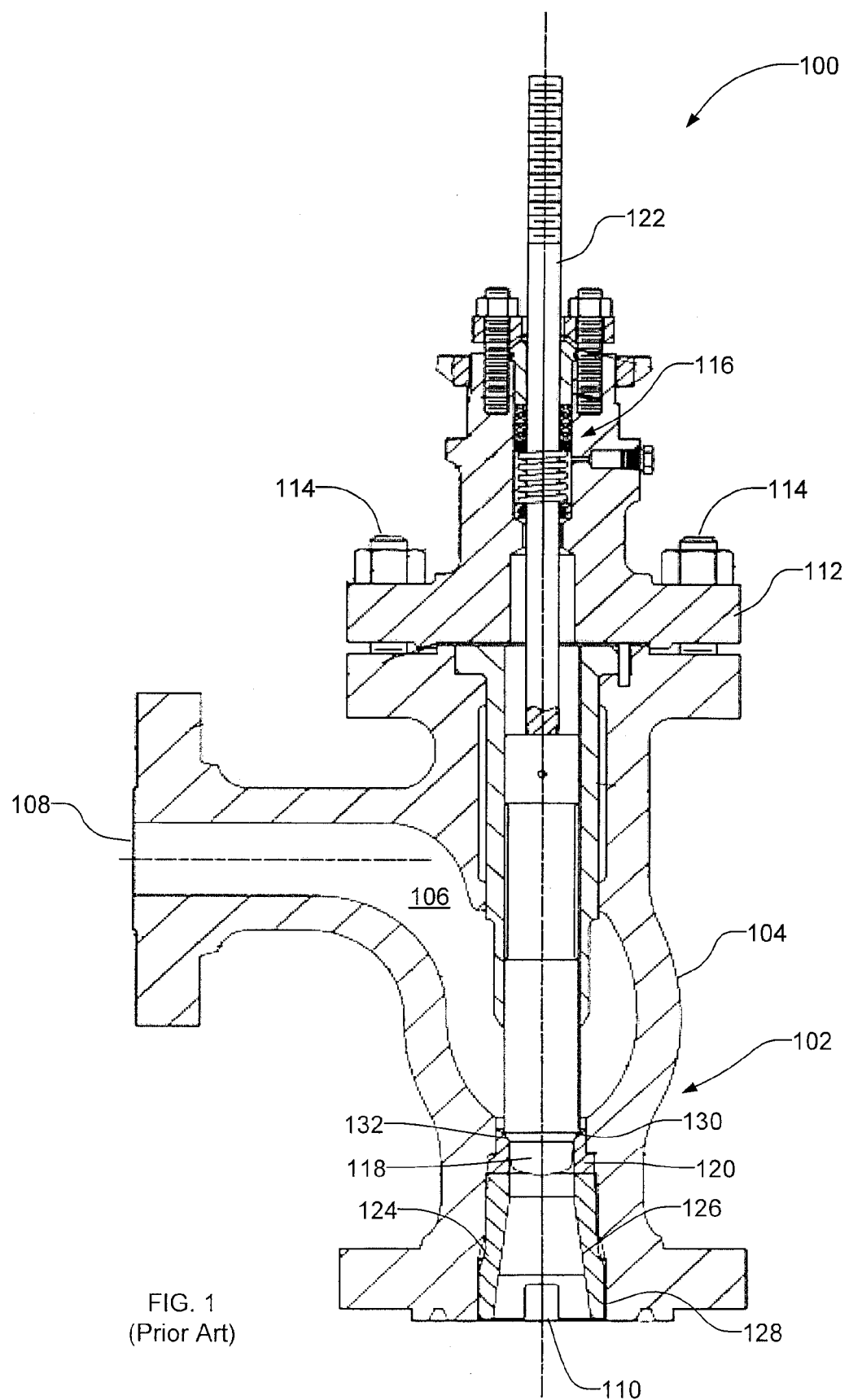
FIG. 1 illustrates a known example fluid valve implemented with a known valve trim apparatus.

FIG. 1 illustrates a known fluid valve assembly 100 (e.g., a flow down angle-style control valve) implemented with a known valve trim apparatus 102 that may be used in severe service applications (e.g., severely erosive process fluid, high pressure applications, etc.). Referring to FIG. 1, the example fluid valve assembly 100 includes a valve body 104 that defines a fluid flow passageway 106 between an inlet or side port 108 and an outlet or bottom port 110. In this example, the inlet 108 is turned at an angle relative to the outlet 110. A bonnet 112 is coupled to the valve body 104 via fasteners 114 and couples the valve body 104 to an actuator (not shown). The bonnet 112 also houses a packing system 116 to prevent leakage of process fluid to the environment.

The valve trim apparatus 102 includes a flow control member or valve plug 118 and a valve seat or seat ring 120 disposed within the passageway 106. An actuator (e.g., a pneumatic actuator, an electric actuator, a hydraulic actuator, etc.) may be operatively coupled to the valve plug 118 via a valve stem 122 to move the valve plug 118 relative to the seat ring 120 to control the fluid flow through the passageway 106 between the inlet 108 and the outlet 110. A seat ring retainer or liner 124 retains the seat ring 120 within the valve body 104 and has an elongated body 126 that extends to protect an interior surface 128 of the outlet 110 from adverse process effects such as, for example, abrasion, erosion, corrosion, etc.

In operation, an actuator drives the valve stem 122 and, thus, the valve plug 118 between a closed position at which the valve plug 118 is sealingly engaged with the seat ring 120 to prevent or restrict fluid flow through the passageway 106 between the inlet 108 and the outlet 110 and a fully open or maximum flow position at which the valve plug 118 is separated from the seat ring 120 to allow fluid flow through the passageway 106 between the inlet 108 and the outlet 110.

In severe service applications (e.g., petrochemical applications), the valve trim apparatus 102 may be exposed to severely erosive and/or corrosive fluid conditions that can rapidly wear or cause material loss to surfaces 130 and/or 132 and significantly reduce the operating life of the valve trim apparatus 102. For example, the valve plug 118 and/or the seat ring 120 may be exposed to process fluids entrained with particulate (e.g., ceramic catalyst fines) or relatively high viscosity fluids, which can wear or degrade the surfaces 130 and/or 132. Thus, in severely erosive fluid conditions, valve plugs and/or valve seats made of ceramic materials are often employed because ceramic materials have relatively high resistance to erosive or corrosive fluid conditions, thereby increasing the operating life of the valve plugs and/or valve seats. For example, referring to the example of FIG. 1, the valve plug 118 and/or the seat ring 120 may be made of a ceramic material.

However, entrained particulate and/or relatively high viscosity fluid may adhere to the sealing surface 130 and/or the seating surface 132 of the valve plug 118 and/or the seat ring 120 as the valve plug 118 sealingly engages the seat ring 120 in the closed position. Further, in this example, particulate suspended in the process fluid, which may be a relatively high viscosity fluid, flows across the seat ring 120 until the valve plug 118 sealingly engages the seat ring 120. Such particulate suspended in the process fluid may adhere to the sealing surface 130 and/or the seating surface 132 as the valve plug 118 sealingly engages the seat ring 120. Such particulate which is typically rigid and highly viscous process fluid can prevent the sealing surface 130 of the valve plug 118 from sealingly engaging with the seating surface 132 of the seat ring 120 to provide a tight shut-off, thereby causing leakage through the passageway 106 when the fluid valve 100 is in the closed position. Thus, a sealing surface of the seat ring 120 and/or the valve plug 118 exposed to particulate and/or highly viscous fluid in this manner becomes ineffective at controlling fluid flow through the fluid valve 100.

Additionally, rigid particulate contaminate can damage the sealing surface 130 of the valve plug 118 and/or the seating surface 132 of the seat ring 120. In some instances, the particulate may cause a valve plug and/or a seat ring made of ceramic to fracture, shatter or crack, resulting in a significantly reduced operating life of the valve trim.

Figure 2A:
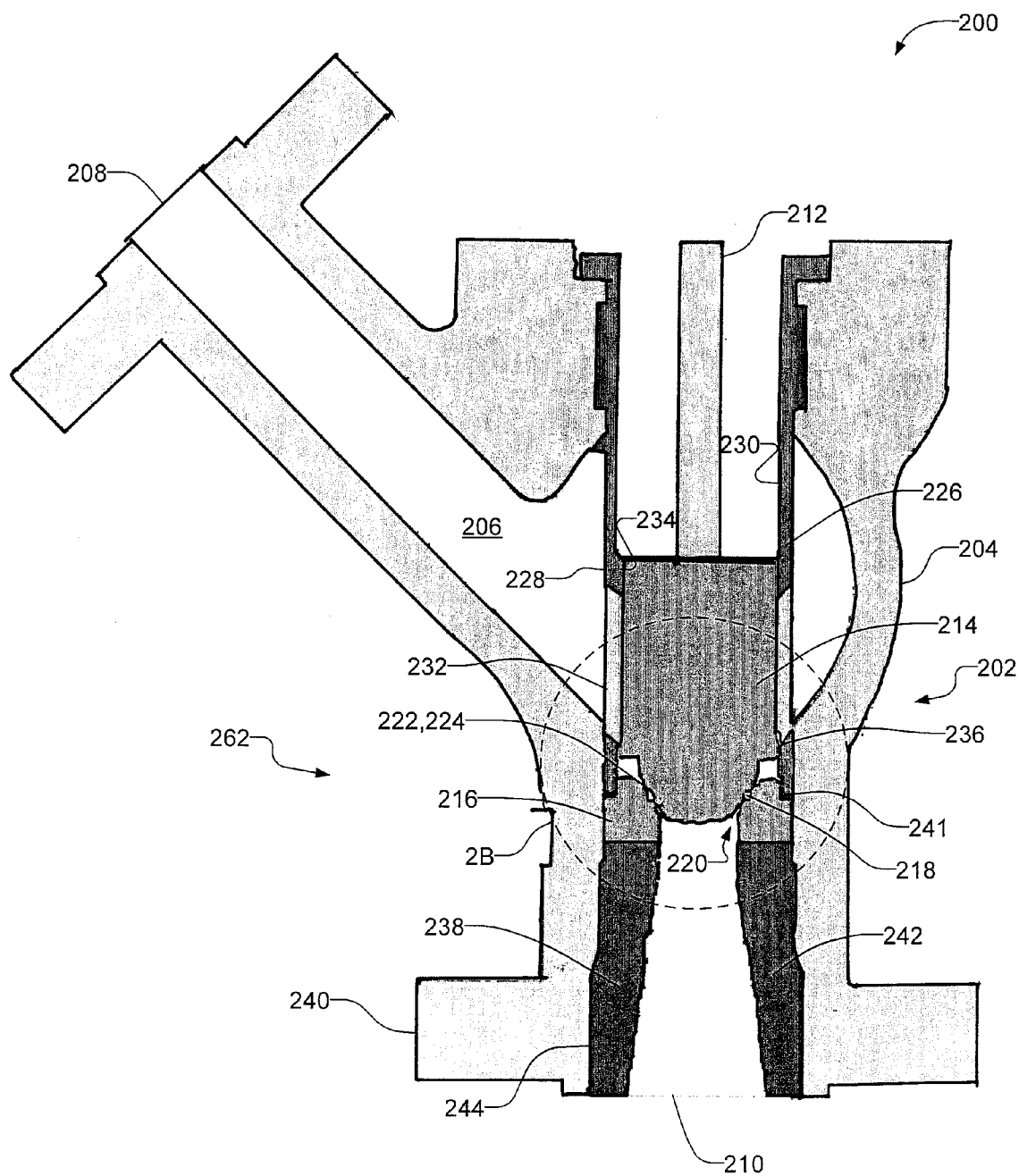
FIG. 2A illustrates an example fluid valve implemented with an example valve trim apparatus described herein.
Figure 2B:
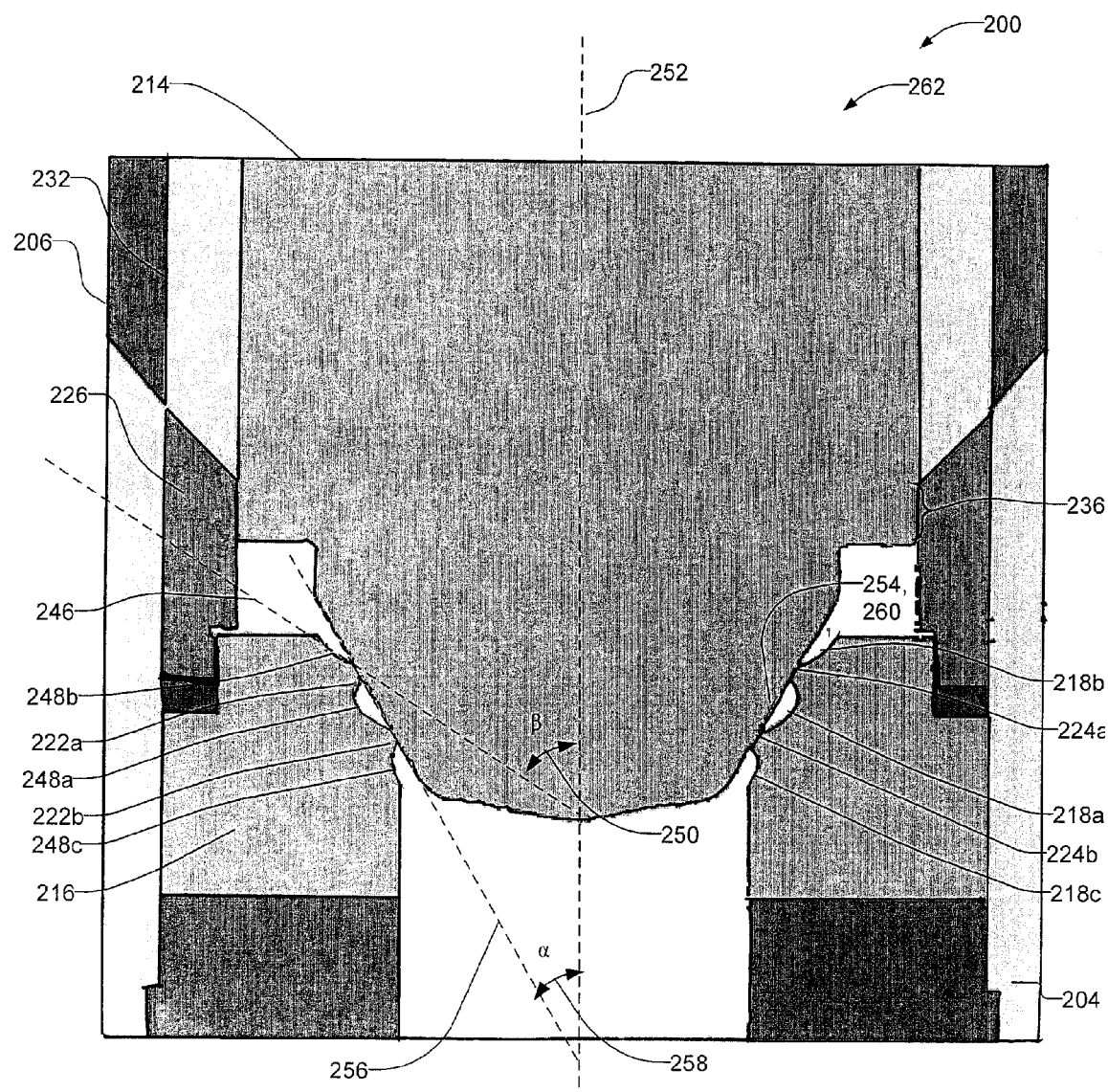
FIG. 2B illustrates an enlarged portion of the example valve trim apparatus illustrated in FIG. 2A shown in a closed position.

FIG. 2A illustrates an example fluid valve 200 implemented with an example valve trim apparatus 202 described herein that may be employed in severely erosive or corrosive applications such as, for example, applications involving relatively highly viscous process fluids and/or process fluids entrained with particulate (e.g., ceramic catalyst fines) or other contaminates. FIG. 2B illustrates an enlarged portion of the example valve trim apparatus 202 shown in FIG. 2A.

Referring to FIG. 2A, the fluid valve 200 includes a valve body 204 defining a passageway 206 between an inlet or side port 208 and an outlet or bottom port 210. The valve trim apparatus 202 is disposed within the passageway 206 of the valve body 204 to control the fluid flow between the inlet 208 and the outlet 210. In the illustrated example, the inlet 208 is substantially angled relative to the outlet 210. A bonnet (not shown) (e.g., similar to the bonnet 112 of FIG. 1) may be coupled to the valve body 204 (e.g., via fasteners) and may also couple the valve body 204 to an actuator (not shown). The actuator may be operatively coupled to the valve trim apparatus 202 via a valve stem 212.

The valve trim apparatus 202 includes a flow control member or closure member 214, which is depicted as a valve plug, and a valve seat 216. One of the closure member 214 or the valve seat 216 is composed of a metal, carbide (e.g., tungsten carbide) or ceramic material and the other one of the closure member 214 or the valve seat 216 is composed of a material different than the material of the closure member 214. In this example, the valve seat 216 is composed of a ceramic material (e.g., carbide) and the closure member 214 is composed of stainless steel. Thus, because the closure member 214 is composed of metal, the closure member 214 will yield (e.g., deform) relative to the valve seat 216 composed of ceramic or carbide to provide a relatively tight shut-off. However, in other examples, the closure member 214 may be composed of a ceramic material and the valve seat 216 may be composed of a metallic material. In yet other examples, the closure member 214 and the valve seat 216 may be composed of a ceramic material or any other suitable erosion and/or corrosion resistant material(s).

As shown in this example, the valve seat 216 and the closure member 214 form or define at least one cavity 218 when the closure member 214 sealingly engages the valve seat 216. More specifically, the cavity 218 is to receive contaminate (e.g., particulate and/or relatively high viscosity fluid) in contact with (e.g., adhered to) a sealing surface or area 220 of the valve seat 216 and the closure member 214 as the closure member 214 sealingly engages the valve seat 216. The cavity 218 may be defined by at least one groove (e.g., an annular groove) formed on the valve seat 216 and/or the closure member 214. For example, the valve seat 216 includes the groove or cavity 218 (e.g., an annular groove or cavity) positioned adjacent an annular rib or projection 222 to form or define a raised seating surface 224. In operation, the cavity or groove 218 receives material or contaminate from the sealing area 220 of the closure member 214 and/or the valve seat 216 as the closure member 214 sealingly engages the valve seat 216. Alternatively, the closure member 214 may include at least one groove or channel 218 to form or define at least one raised seating surface 224 or annular rib 222 instead of the valve seat 216. In yet another example, each of the valve seat 216 and the closure member 214 includes at least one groove or cavity 218 to form at least one raised seating surface 224 or annular rib 222.

In this example, the valve trim apparatus 202 also includes a cage 226 disposed between the inlet 208 and the outlet 210 to impart certain flow characteristics (e.g., reduce noise and/or cavitation generated by) the process fluid flowing through the fluid valve 200. The cage 226 can also facilitate maintenance, removal, and/or replacement of the other components of the valve trim apparatus 202. The cage 226 may be composed of a high strength, erosion and/or corrosion resistant material (e.g., stainless steel) and a surface 228 of the cage, which is in fluid communication with the inlet 208, may include (e.g., may be plated by) nitride, carbide and/or any other erosion or corrosion resistant material(s).

As shown, the cage 226 includes a bore 230 to slidably receive the closure member 214 and guide the closure member 214 as an actuator moves the closure member 214 between a first position (e.g., a fully closed position) and a second position (e.g., a fully open position). The cage 226 also includes an orifice 232 to provide fluid flow characteristics. The desired fluid flow characteristics are achieved by varying the geometry of the orifice 232. In some example implementations, the cage 226 may include a plurality of openings having various shapes, sizes, and/or spacing to control the flow, reduce cavitation, and/or reduce noise through the valve.

In this example, the closure member 214 is a valve plug having an outer surface or body portion 234 sized to closely fit within the bore 230 of the cage 226. The closure member 214 can slide within the cage 226 between a closed position, in which the closure member 214 obstructs the orifice 232 of the cage 226, and an open position, in which the closure member 214 is clear of (i.e., does not obstruct) at least a portion of the orifice 232. Additionally, in this example, as described in greater detail below, the body portion 234 provides a dead-band area or zone 236 dimensioned to block or obstruct fluid flow through the orifice 232 of the cage 226 and prevent or restrict fluid flow across the valve seat 216 over a portion of the stroke as the closure member 214 moves toward the valve seat 216 and before the closure member 214 sealingly engages the valve seat 216. In other words, the cage 226 and the closure member 214 are configured to provide a fluid flow dead-band to protect the sealing area 220 from erosion, corrosion and damage and/or reduce the amount of contaminate surrounding the sealing area 220 as the closure member 214 moves toward the valve seat 216.

In the example illustrated in FIGS. 2A and 2B, the valve seat 216 is a seat ring that is clamped adjacent the outlet 210 of the valve body 204. The example fluid valve 200 also includes a liner 238 that is clamped between an outlet flange 240 of the valve body 204 and downstream piping (not shown). The valve seat 216 is clamped between the cage 226 and the liner 238 and is retained in the valve body 204 via interference fit. A seal 241 may be disposed between the seat 216 and the cage 226. The liner 238 includes an elongated body 242 that extends to protect a surface or side 244 of the outlet 210 from adverse process effects such as, for example, abrasion, corrosion, etc. In other examples, the liner 238 may be integrally formed with the valve seat 216 as a substantially unitary member or structure. In yet another example, the liner 238 is coupled to the valve body 204 via threads, fasteners and/or other suitable fastening mechanism(s).

As most clearly shown in FIG. 2B, the valve seat 216 includes a plurality of annular protrusions or ribs 222a-b that define cavities or grooves 218a-c (e.g., annular grooves) and a plurality of raised seating surfaces 224a-b. A first rib 222a provides a first raised seating surface 224a independent from a second raised seating surface 224b provided by a second rib 222b. In this manner, the raised seating surfaces 224a-b provide redundant sealing surfaces so that if one of the ribs 222a or 222b and/or the raised seating surfaces 224a-b becomes damaged or worn, the other one of the ribs 222a or 222b and/or raised seating surfaces 224a or 224b sealingly engages the closure member 214 to provide a tight shut-off. In this example, the raised seating surfaces 224a-b or ribs 222a-b are integrally formed with the valve seat 216 as a unitary structure. For example, the cavities or grooves 218a-c and/or the ribs 222a-b may be formed via machining or any other suitable manufacturing process(es) to provide the raised seating surfaces 224a-b.

Referring to FIG. 2B, the annular ribs or protrusions 222a-b include an angled profile 246. In this example, the angled profile 246 of the annular ribs or protrusions 222a-b includes sloped surfaces 248a-b having a downward inclination away from the inlet 208 and toward the outlet 210. In this example, the angled profile 246 provides an angle 250 that is approximately sixty degrees relative to a longitudinal axis 252 of the closure member 214. However, in other examples, the angled profile 246 may provide any other suitable angle. Alternatively, each of the sloped surfaces 248a-b may have different angles. For example, a surface 248c of the annular groove 218c may have an angled profile different (e.g., a sloped surface at a greater angle) than the angled profile 246 of the surfaces 248a-b. As discussed in greater detail below, the angled profile 246 facilitates movement or collection of contaminate toward the grooves or cavities 218a-c. Additionally or alternatively, the angled profile 246 reduces damage (e.g., cracking) to the raised seating surfaces 224a-b and/or the ribs 222a-b of the valve seat 216 that may caused by a thrust force imparted by an actuator to the valve seat 216 and/or closure member 214 when the fluid valve 200 is in a closed position.

The closure member 214 also includes a sealing surface 254 that sealingly engages the raised seating surfaces 224a-b of the valve seat 216 when the closure member 214 sealingly engages the valve seat 216. Thus, the raised seating surfaces 224a-b include an angled profile 256 providing an angle 258 (e.g., a 30 degree angle) that is substantially similar or identical to an angled profile or angle 260 of the sealing surface 254 so that the sealing surface 254 of the closure member 214 matably and/or sealingly engages with the raised seating surfaces 224a-b of the valve seat 216 to provide a tight shut-off. As noted above, the closure member 214 may include at least one groove or channel to form or define at least one raised seating surface or annular rib instead of the valve seat 216, which sealingly engages a seating surface of the valve seat 216. In yet another example, each of the valve seat 216 and the closure member 214 includes at least one groove or cavity to form at least one raised seating surface or annular rib.

In operation, an actuator may stroke or move the closure member 214 between a closed position or zero percent (0%) stroke length travel and an open position or 100 percent stroke length travel. FIGS. 2A and 2B illustrate the closure member 214 at a closed position 262 (i.e., a zero percent travel of the stroke length) relative to the valve seat 216. In the closed position 262 of FIGS. 2A and 2B, the sealing surface 254 of the closure member 214 sealingly engages the raised seating surfaces 224a-b of the valve seat 216 to prevent or restrict fluid flow through the passageway 206 between the inlet 208 and the outlet 210. Particulate and/or viscous fluid on the raised seating surfaces 224a-b of the valve seat 216 and/or the sealing surface 254 of the closure member 214 will be channeled, wiped away or other wised moved from the sealing area 220 and toward the cavities or grooves 218a-c.

In other words, the cavities or grooves 218a-c receive contaminate as the sealing surface 254 of the closure member 214 sealingly engages the raised seating surfaces 224a-b of the valve seat 216. Contaminate in contact with the raised seating surfaces 224a-b and/or the sealing surface 254 will be wiped away from the sealing surface 254 and/or the raised seating surfaces 224a-b and forced or moved (e.g., pushed) toward the grooves or cavities 218a-c by the sealing surface 254 of the closure member 214 as it engages the raised seating surfaces 224a-b. Also, the angled profile 256 of the raised seating surfaces 224a-b and/or the angled profile 260 of the sealing surface 254 facilitate collection of contaminate in the cavities or grooves 218a-c.

Further, the angled profile 246 (e.g., the sloped surfaces 248a-c) of the ribs 222a-b facilitate movement of contaminate (e.g., relatively high viscous fluid, particulate suspended in the fluid flow, etc.) in contact with the sealing area 220 away from and/or toward the cavities or grooves 218a-c as the closure member 214 sealingly engages the valve seat 216. If one of the raised seating surfaces 224a-b become damaged or worn, the other one of the raised seating surfaces 224a-b provides a seal when the closure member 214 engages the valve seat 216. Thus, the raised seating surfaces 224a-b provide redundant sealing.

Figure 3:
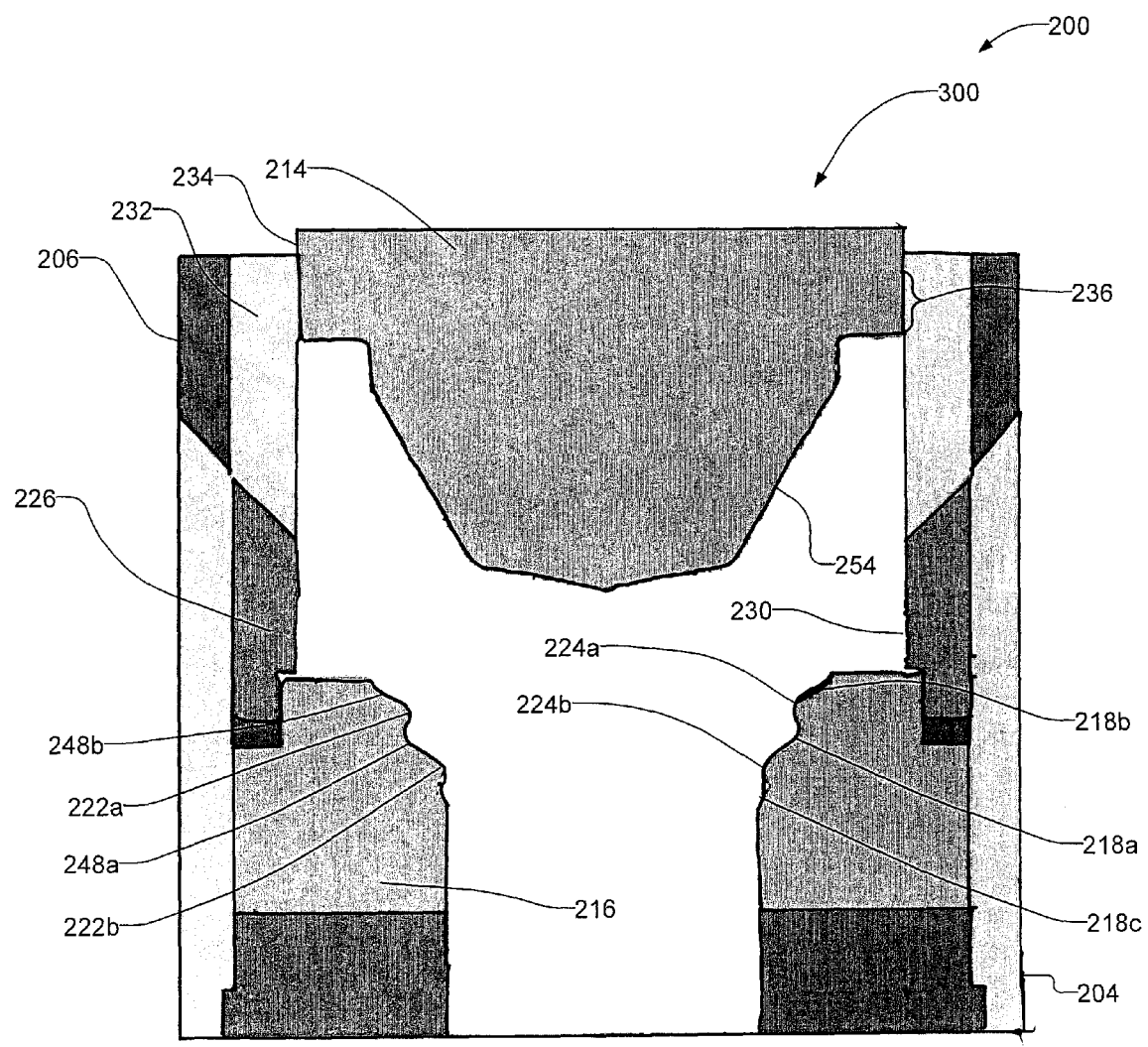
FIG. 3 illustrates an enlarged portion of the example valve trim apparatus illustrated in FIGS. 2A and 2B shown in an open position.

Additionally, as noted above, the example valve trim apparatus 202 provides an effective fluid flow dead-band to reduce particulate or contaminate flowing across and/or adhering to the sealing area 220 as the closure member 214 moves from an open position 300 (i.e., 100 percent travel of the stroke length) as shown in FIG. 3 and the closed position 262 shown in FIGS. 2A and 2B.

At the fully open position 300 shown in FIG. 3, the closure member 214 is separated from the valve seat 216 to enable a maximum fluid flow through the passageway 206 of the valve body 204 between the inlet 208 and the outlet 210. Relatively high viscosity fluid and/or fluid entrained with particulate flows through the passageway 206 across the valve seat 216. The valve seat 216, which may be composed of ceramic material, resists erosion and corrosion as particulate suspended in process fluid flows across the valve seat 216. To restrict or prevent fluid flow between the inlet 208 and the outlet 210, the actuator moves the closure member 214 toward the valve seat 216. The closure member 214 slides within the cage 226 between the open position 300, in which the body portion 234 of the closure member 214 is clear of at least a portion of the orifice 232 and the closed position 262 (FIGS. 2A and 2B), in which the body portion 234 of the closure member 214 obstructs the orifice 232 of the cage 226.

Figure 4:
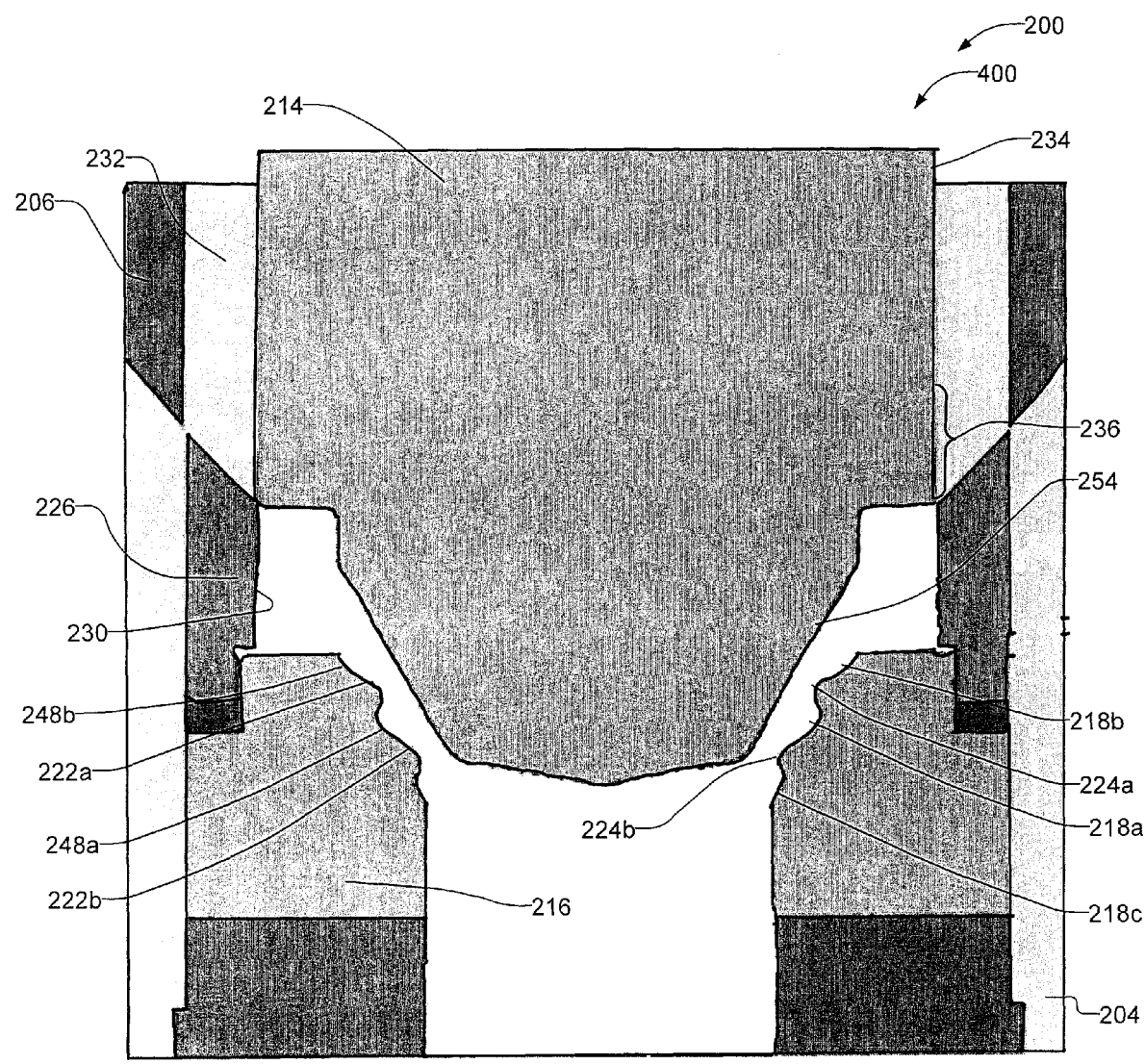
FIG. 4 illustrates an enlarged portion of the example valve trim apparatus illustrated in FIGS. 2A, 2B and 3 shown in an intermediate position.

FIG. 4 illustrates the closure member 214 at an intermediate position 400 as the closure member 214 moves between the open position 300 shown in FIG. 3 and the closed position 262 shown in FIGS. 2A and 2B. As shown in FIG. 4, when the closure member 214 moves between the intermediate position 400 and the closed position 262, the dead-band area or zone 236 of the closure member 214 obstructs or blocks the orifice 232 of the cage 226 to restrict or prevent fluid flow across the valve seat 216 before the sealing surface 254 of the closure member 214 sealingly engages the raised seating surfaces 224a-b of the valve seat 216. Thus, the fluid flow dead-band zone or area 236 of the closure member 214 moves relative to and/or adjacent the opening of the cage 226 to provide a dead-band stroke length travel to the overall stroke length travel of the closure member 214. The dead-band zone or area 236 of the body portion 234 and/or the sealing surface 254 may be configured to provide a predetermined fluid flow dead-band prior to when the fluid valve 200 is in the fully closed position 262 as shown in FIGS. 2A and 2B. Additionally or alternatively, the orifice 232 of the cage 226 may be dimensioned or sized to provide an effective dead-band stroke length travel.

In operation, the dead-band zone or area 236 restricts or blocks particulate suspended within the fluid flow before the closure member 214 sealingly engages the valve seat 216 in the closed position 262. Restricting the fluid flow across the valve seat 216 before the closure member 214 sealingly engages the valve seat 216 significantly reduces a residual quantity of contaminate or particulate suspended in the flowing fluid from gathering or adhering to the sealing area 220 of the valve trim apparatus 202 as the closure member 214 is moving toward the valve seat 216. Further, the pressure of the fluid at the outlet 210 moves or pushes the particulate away from the valve seat 216 and/or the closure member 214 and toward the outlet 210 of the fluid valve 200.

Additionally, because the closure member 214 restricts or inhibits fluid flow through the fluid valve 200 during the fluid flow dead-band, a relatively high pressure fluid at the inlet 208 does not flow across the sealing surface 254 of the closure member 214 and/or the raised seating surfaces 224a-b of the valve seat 216. Reducing or minimizing a relatively high pressure fluid across the sealing area 220 significantly increases the operating life of the sealing surface 254 and/or the raised seating surfaces 224a-b and, thus, the valve trim apparatus 202.

The above-noted valve trim examples are advantageous in severely erosive fluids such as, for example, relatively high viscosity fluids and/or fluids containing particulate (e.g., ceramic catalyst fines), which can prevent the closure member 214 and the valve seat 216 from properly sealingly engaging, thereby causing leakage of process fluid through the passageway 206 when the fluid valve 200 is in the closed position 262. In this example, the closure member 214 and the valve seat 216 cooperatively engage to define a cavity and move contaminate from a sealing surface of the valve seat 216 or valve closure member 214 to the cavity as the valve closure member 214 moves toward a sealing engagement with the valve seat 216. The valve trim apparatus is configured to wipe away particulate, contaminate and/or high viscosity fluids from the sealing area 220 when the closure member 214 sealingly engages the valve seat 216. Further, an effective fluid flow dead-band reduces contaminant (e.g., relatively high viscous fluid or a particulate suspended in the fluid) from adhering to the sealing area 220 of the valve seat 216 and/or the closure member 214 as the closure member 214 is moving toward the valve seat 216.

Due to the angle of the valve body 204, angle-style valves advantageously allow for easy draining because the valve body or flow path of such valves does not have any pockets or areas that allow accumulation of fluid and/or residue. Thus, angle-style control valves are typically used in the chemical and petroleum industries, which often require control of residual oils or other liquids with coking properties. However, the example valve trim apparatus described herein are not limited to use with angle-style fluid valves. In other examples, fluid valves such as, for example, globe valves, rotary valves, linear valves, etc., may be employed.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:
1. A valve trim apparatus comprising:
a valve seat;

a closure member movable along a longitudinal axis to operatively engage the valve seat, wherein one of the closure member or valve seat includes a plurality of annular ribs, the one of the valve seat or closure member defines at least one groove positioned between at least two of the annular ribs to receive material from a sealing surface of the other one of the closure member or valve seat when the closure member is sealingly engaged with the valve seat, and each of the at least two annular ribs possesses a raised surface angled relative to the longitudinal axis prior to engagement of the closure member and the valve seat;

an angle of the sealing surface being substantially similar to an angle of the at least two raised surfaces such that the sealing surface sealingly engages the at least two raised surfaces to provide a tight shut-off; and a cage operatively coupled to the plug so that fluid flow through the cage is substantially blocked as the closure member moves toward the valve seat and before the closure member is sealingly engaged with the valve seat.

2. A valve trim apparatus as defined in claim 1, wherein the annular ribs are structured to provide redundant sealing surfaces.

3. A valve trim apparatus as defined in claim 1, wherein the material comprises at least one of particulate or a relatively high viscosity fluid in contact with the sealing surface of the valve seat or closure member prior to being received in the at least one groove.

4. A valve trim apparatus as defined in claim 1, wherein the valve seat is a seat ring and the plurality of annular ribs are integral with the seat ring.

5. A valve trim apparatus as defined in claim 4, wherein the seat ring is clamped adjacent an outlet port of a valve body.

6. A valve trim apparatus as defined in claim 1, wherein each of the raised surfaces is configured to facilitate collection of material in the at least one groove.

7. A valve trim apparatus as defined in claim 6, wherein each of the raised surfaces is angled at about sixty degrees relative to the longitudinal axis.

8. A valve trim apparatus as defined in claim 1, wherein one of the closure member or valve seat comprises metal, carbide or ceramic and the other one of the closure member or valve seat comprises a different material.

9. A valve trim apparatus as defined in claim 1, wherein the raised surfaces are angled in the same direction relative to the longitudinal axis.

10. A valve trim apparatus comprising:
a valve seat;
a valve closure member, wherein the valve closure member and the valve seat cooperatively engage to define a cavity and move contaminate from a sealing surface of the valve closure member to the cavity as the valve closure member moves along a longitudinal axis toward a sealing engagement with the valve seat, and the cavity is bounded on opposite sides by a first annular protrusion and a second annular protrusion extending from the valve seat, the first annular protrusion possessing a first raised surface configured to engage the valve closure member, the second annular protrusion possessing a second raised surface configured to engage the valve closure member, the first and second raised surfaces being angled in the same direction relative to the longitudinal axis prior to engagement of the closure member and the valve seat;

an angle of the sealing surface being substantially similar to an angle of the first raised surface and an angle of the second raised surface such that the sealing surface sealingly engages the first and second raised surfaces to provide a tight shut-off; and a cage configured to provide a flow dead-band zone to protect the sealing surface from erosion, wherein the dead-band zone restricts particulate suspended in a fluid flow prior to engagement of the closure member and the valve seat.

11. A valve trim apparatus as defined in claim 10, wherein the cavity comprises an annular groove on the valve seat.

12. A valve trim apparatus as defined in claim 10, wherein the valve closure member is a plug and the valve seat is a seat ring.

13. A valve trim apparatus as defined in claim 10, wherein the contaminate comprises a relatively high viscosity fluid or a particulate suspended in the fluid.

14. A valve trim apparatus as defined in claim 10, wherein the first annular protrusion and the second annular protrusion are configured to move the contaminate from the sealing surface of the valve seat to the cavity.

15. A valve trim apparatus as defined in claim 14, wherein the annular protrusions are structured to provide redundant sealing surfaces.

16. A valve trim apparatus, comprising:
means to control a flow of fluid through a valve; and
means to remove contaminate from a first sealing surface of the valve as the valve is closed, the means to remove contaminate including a second sealing surface angled relative to a longitudinal axis of the valve;
means to collect the removed contaminate, the means to collect the removed contaminate being positioned between a first annular rib having a first raised surface and a second annular rib having a second raised surface, wherein the means to remove the contaminate and the means to collect the removed contaminate are operatively engaged as the valve is closed, and wherein the first and second raised surfaces are angled relative to a longitudinal axis of the valve prior to engagement of the means to remove the contaminate and the means to collect the removed contaminate;
an angle of the second sealing surface being substantially similar to an angle of the first raised surface and an angle of the second raised surface such that the second sealing surface sealingly engages the first and second raised surfaces to provide a tight shut-off; and
means to provide a fluid flow dead-band zone prior to when the valve is closed.

17. A valve trim apparatus as defined in claim 16, wherein the means to remove the contaminate and the means to collect the removed contaminate are integral features of a structure separate from the means to control.

18. A valve trim apparatus comprising:
a valve seat;
a closure member movable along a longitudinal axis to operatively engage the valve seat, wherein one of the closure member or valve seat includes a plurality of annular ribs, at least one of the valve seat or closure member defines at least one groove positioned between at least two of the annular ribs to receive material from a sealing surface of the closure member or valve seat when the closure member is sealingly engaged with the valve seat, and each of the at least two annular ribs possesses a raised surface angled relative to the longitudinal axis prior to engagement of the closure member and the valve seat;
wherein each of the raised surfaces is configured to facilitate collection of material in the at least one groove; and wherein each of the raised surfaces is angled at about sixty degrees relative to the longitudinal axis.

* * * * *